Aug. 23, 1949.

C. R. STOCK 2,479,984

APPARATUS FOR MEASURING DISTORTION TEMPERATURE OF PLASTIC MATERIALS

Filed Dec. 3, 1946

INVENTOR
CHARLES R. STOCK,
BY
Lewis H. Lanman
ATTORNEY

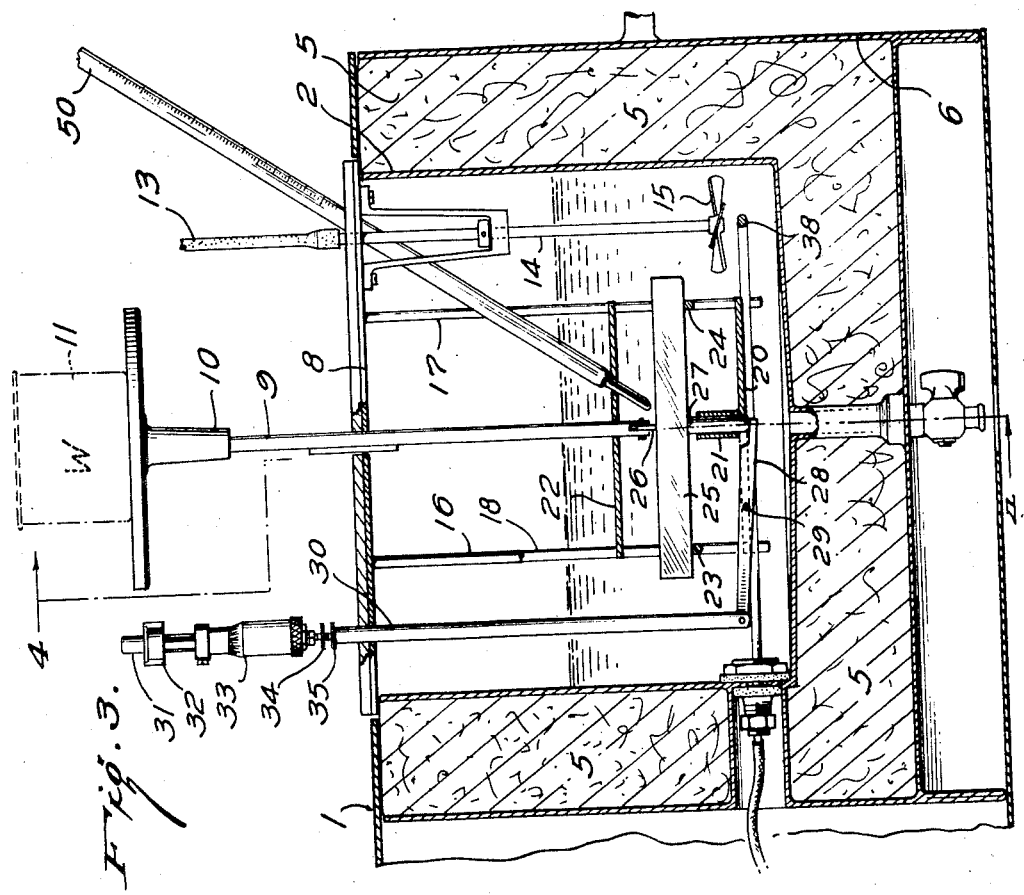
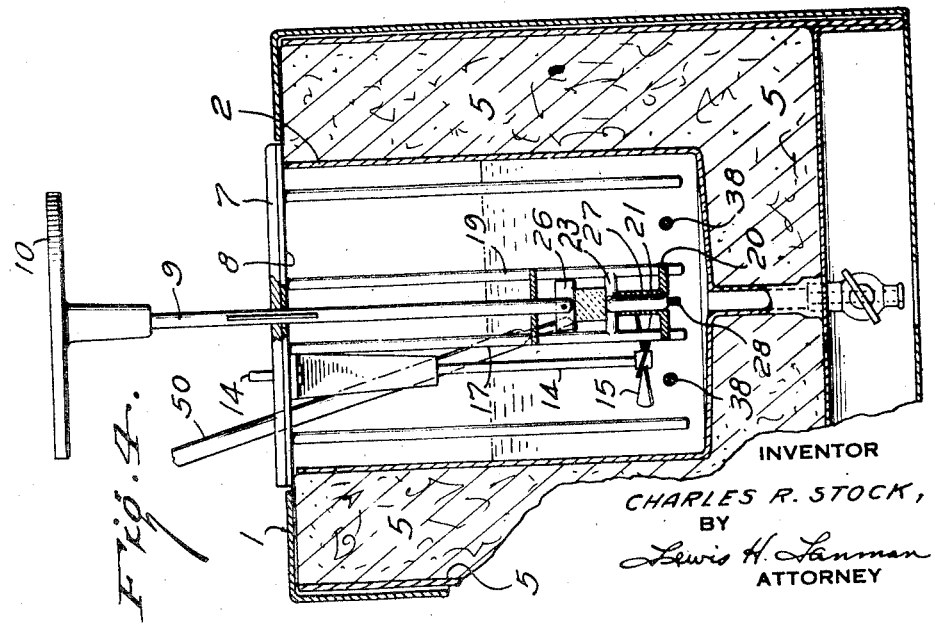

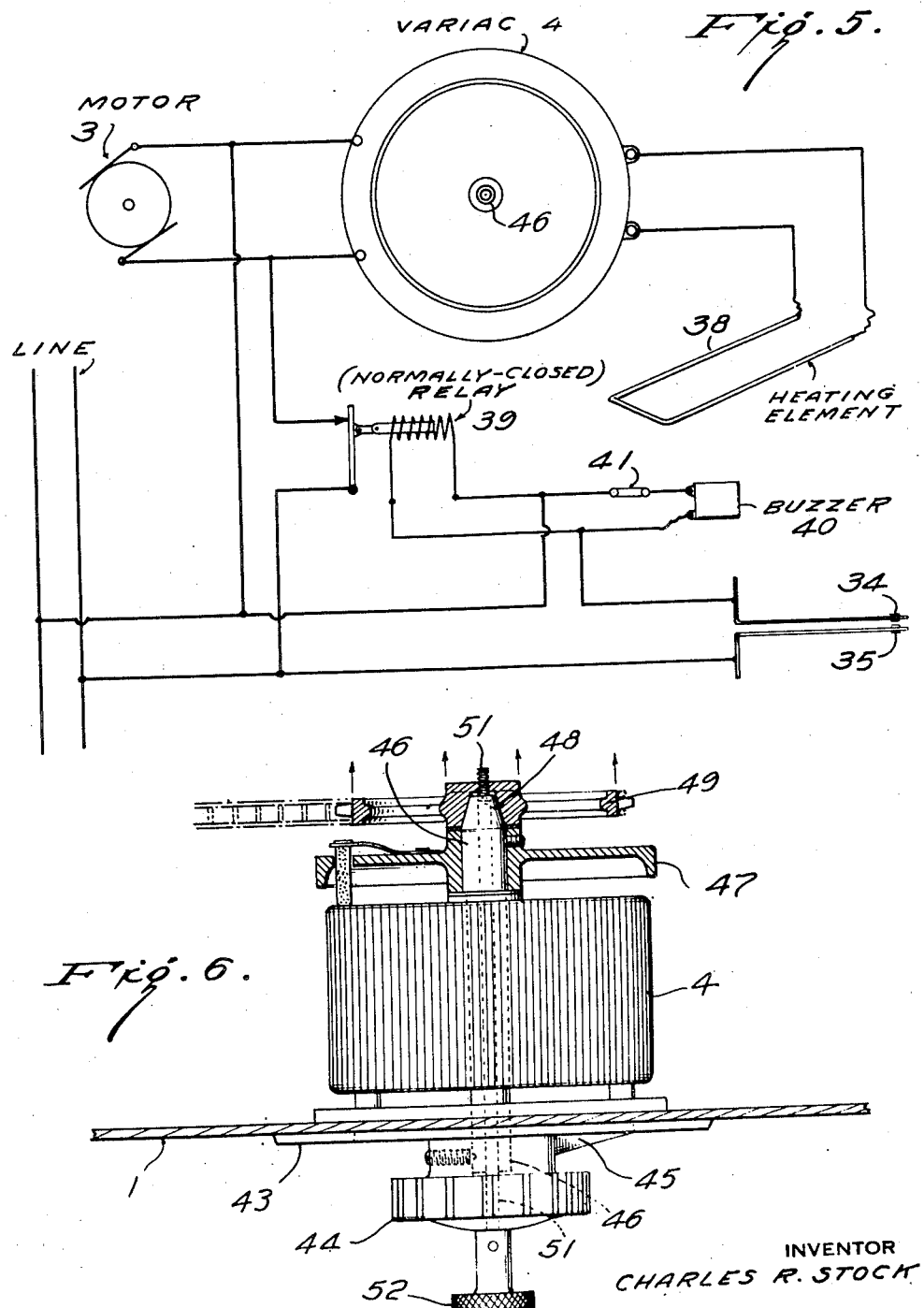

Patented Aug. 23, 1949

2,479,984

UNITED STATES PATENT OFFICE 2,479,984

APPARATUS FOR MEASURING DISTORTION TEMPERATURE OF PLASTIC MATERIALS

Charles R. Stock, South Norwalk, Conn., assignor to American Cyanamid Company, New York, N. Y., a corporation of Maine Application December 3, 1946, Serial No. 713,761

3 Claims. (Cl. 73—16)

This invention relates to apparatus for measuring the heat distortion temperatures of plastic materials, and more particularly to improvements in apparatus for automatically determining temperatures at which plastic materials loaded as a simple beam will be distorted inelastically to a predetermined extent.

The heat distortion test has been extensively used in the plastic industry for many years as a means of obtaining a relative measure of the temperature at which a plastic is sufficiently softened to permit it to deflect at the center by a given amount (usually 0.010 inch) while under load.

The heating system is so operated that the test usually starts at about 25° C., or room temperature. The temperature is then increased at a slow, uniform rate until an indicator shows that the required deflection has been reached. The temperature at this end-point in the test is called the heat distortion temperature.

In the past several types of apparatus have been constructed for measuring distortion temperatures of plastic materials. However, such devices of the prior art are attended by several drawbacks which involve operating difficulties and introduce serious error in results thereby preventing accurate measurements. For instance, previous instruments have employed a vertical rod for loading or weighting the plastic specimen, the heat distortion characteristic of which is to be measured. The loading rod in such devices is also used to measure the deflection of the specimen. This construction and procedure introduces an error in the result because of thermal expansion of the specimen in its vertical dimension, which in some instances amounts to 60–70% of the total measured deflection. A further error in the prior art devices resulting from the use of the loading rod to measure the deflection of the plastic bar occurs due to the linear expansion of the rod when heated.

Another serious error which can affect test results arises from the occurrence of blistering in the material. If indication of deflection is taken from the upper surface of the specimen, blistering or swelling can raise the indicating and loading bar or impede its normal downward movement as heating progresses. This delays the end-point of the test, that is, the production of the selected predetermined amount of deflection in the specimen. As a consequence, the temperature reading at the given amount of distortion is too high.

Also, using the loading rod to measure deflection, a serious error would occur if the plastic softened sufficiently to permit the rod to sink into its upper surface at the point of contact before the specimen had actually deformed by the predetermined amount. In this case the heat distortion temperature measured would be too low.

Furthermore, the devices of the prior art have not successfully provided for an accurate control of temperature increase. Such instruments have used manual control or elaborate automatic controls, neither of which produced an accurate and uniform rate of temperature rise.

All of the disadvantages and inaccuracies above-discussed are eliminated according to the present invention by providing for measurement of the deflection in the specimen due to heat distortion under load from the under side of the sample being tested. This improvement in the construction and principle of operation not only eliminates errors due to thermal expansion of the specimen and loading rod in the vertical direction, or error due to premature softening of the top of the specimen in contact with the loading rod; but also provides an indication of the upper limit of the temperature range in which the plastic is utilizable. In other words an added significance is given the heat distortion temperature when the deflection is measured from the under side of the specimen.

The device of the present invention in its preferred form is provided with simplified automatic control for producing a uniform rate of temperature increase.

In conjunction with the preferred embodiment of the invention there is also provided an automatic indication of the end-point of the test, that is, an automatic indication when the specimen being heat distorted has deflected an amount equal to the selected predetermined extent, and a means for automatically interrupting the operation of the control means for the heater at the end-point of the test so that no further increase in temperature can occur.

The apparatus of the present invention embodies a receptacle for a suitable heat transfer medium and a means for increasing the temperature of the medium at a uniform rate. A supporting means or framework is provided for mounting the plastic specimen to be tested within the receptacle so that the latter is immersed in the medium. Preferably the apparatus is provided with an efficient stirring device for maintaining uniform temperature conditions within the medium.

The plastic specimen mounted in the receptacle is subjected to a load by use of a weight or weights or by employing a loading rod or other suitable weight transmitting means.

A linkage mechanism actuated by deformation of the plastic specimen is provided for transmitting the deflection of the specimen to an indicator. According to the invention, the mechanism is located in a novel position, namely, at the center of the lower surface of the test specimen, in order to eliminate from the deflection measurement, motion caused by the thermal expansion of the plastic in the vertical direction.

Another advantage of this construction, namely measurement of the bending of the plastic at the center of its lower surface, is the added significance of the heat distortion temperature when so measured. Thus, an indication of the upper limit of the true range of operating temperatures of the type of plastic being tested is provided, since any blistering will add to the deflection measured and hasten the end-point of the test. This will give a lower heat distortion temperature than the theoretically correct one, but the lower temperature obtained will be an indication that the material is not practically suited for use above the temperature measured for another reason, namely failure due to blistering.

The indicating mechanism is actuated by movement of the linkage mechanism, the latter being responsive to deflection from the under side of the plastic specimen being tested. This indicating mechanism may be a dial gauge or any suitable means for visibly indicating that the specimen has deflected the selected predetermined amount under the required load conditions when heated. The indicating device may also be constructed so that it is set for the predetermined amount of deflection in the specimen and an audible signal and/or interruption of the operation of the heating means occurs when the linkage mechanism actuates the indicating device at the setting corresponding to the predetermined deflection of the specimen.

A temperature responsive device is provided for measuring the temperature of the heating medium and the specimen being tested. The temperature indicated by this device is noted when the indicating mechanism shows that the required deflection has occurred, and this temperature is the heat distortion temperature, as measured, of the particular plastic under test.

The device of the present invention is more fully described and illustrated with reference to the accompanying drawings which constitute a preferred embodiment of the invention and are not intended to be regarded as a limitation thereof, in which, Figure 1 is a front view of the heat distortion tester as assembled;

Figure 3 is a longitudinal sectional view of a portion of the device as assembled showing the linkage mechanism and supporting framework;

Figure 4 is a transverse section taken on the line 4—4 of Figure 3 looking in the direction of the arrows;

Figure 5 is a diagrammatic view of the preferred circuit arrangement for the motor driven transformer, heater, audible warning signal and automatic cut-off of the device, and Figure 6 is a detail section taken along the line 6—6 of Figure 1.

Figure 1:
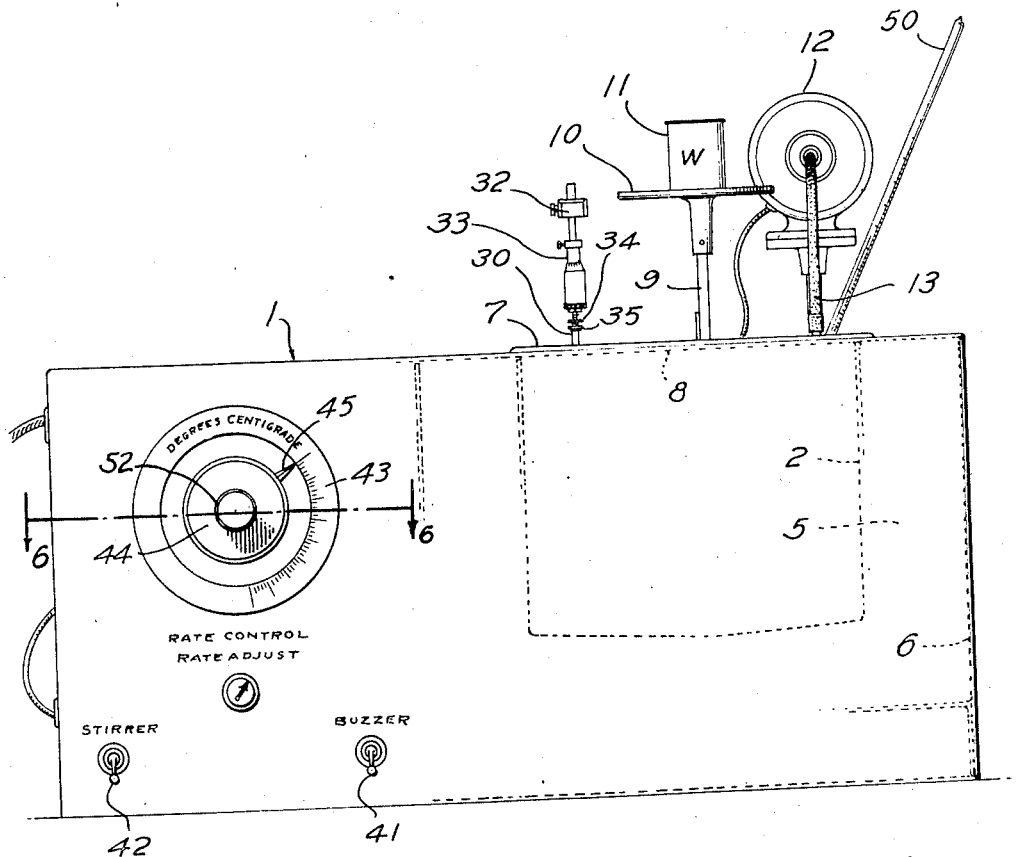

Figure 1 shows a unitary housing 1 having an aperture therein adapted to removably contain a thermally insulated tank 2, also shown in Figures 3 and 4. The tank 2 occupies only a portion of the housing 1, the balance of the space containing the driving motor 3 and motor-driven variable transformer 4, shown diagrammatically in Figure 5. The tank 2 is a metal tank provided with insulation 5, such as magnesia block, on four sides and the bottom, enclosed in an outer box 6 as shown also in Figures 3 and 4. A lid 7 of heat insulating plastic provides a closure for the tank 2 and also carries plate 8 from which the specimen supporting framework and linkage mechanism, described in detail below, are dependent.

Also shown in Figure 1 is a portion of the loading rod 9 with a platform 10 attached to the upper portion thereof outside of the housing 1. The platform is adapted to carry a weight 11, or weights for providing a load for the plastic specimen under heat distortion test. The loading rod 9 may be constructed of any suitable material and need not be a metal of low linear coefficient of thermal expansion since its only function is to transmit force and not to indicate deflection.

A motor 12 is mounted on the housing 1 and is provided with a flexible connection 13 for driving the stirrer 15 through the shaft 14 as shown in Figure 3.

Referring now to Figures 3 and 4, the supporting framework and linkage mechanism will be described in detail. Plate 8 has attached thereto two pairs of vertical rods preferably of Invar metal 16 and 18, and 17 and 19 suitably spaced for supporting a plastic specimen of the size to be tested. (Usually the plastic bar is ½ x ½ inch square and 5 inches long according to A. S. T. M. standards.) The lower ends of the rods are bolted to a small metallic plate 20 for providing a rigid framework. This plate 20 also has a hollow cylinder 21 centrally positioned thereon for housing a part of the deflection indicating mechanism described in detail below.

A second plate 22 is carried by vertical rods 16, 17, 18 and 19 in circumferential grooves therein (not shown), and is positioned above the lower plate by an amount sufficient to leave a space for mounting the plastic specimen to be tested. This plate 22 contains apertures for guiding the loading rod 9 and the well of a thermometer 50 inserted through the lid 7 and plate 8 and used to indicate the temperature of the heating medium in tank 2 and the heat distortion temperature of the specimen being tested.

Two short rods 23 and 24 are fastened horizontally in the short direction between pairs 16 and 18, and 17 and 19 of the vertical rods. Rods 23 and 24 support the plastic bar 25 to be tested and are positioned between plates 20 and 22.

The load rod 9, described above is adapted to pass through lid 7 and plate 8 and the guide plate 22 and apply the load to the specimen 25 by means of a self-aligning foot 26 rounded to give a cylindrical contact surface of a selected radius (e. g. ⅛ inch) across the full width of the specimen.

The linkage mechanism for transmitting the deformation of the plastic bar to the indicating mechanism comprises a short cylindrical plug 27, preferably of Invar metal, freely sliding within the hollow cylinder 21 on plate 20. The upper rounded end of plug 27 touches the plastic bar 25 and the lower end rests on the free end of a lever 28 fulcrumed to a pin 29 set in plate 20.

The arms of the lever afford an amplification of the distortion of the plastic bar, of for example 1.5 to 1. A vertical rod 30 is connected to the long end of the lever and passes up through an aperture in the lid 7 and plate 8 to the indicating mechanism.

Figure 2:
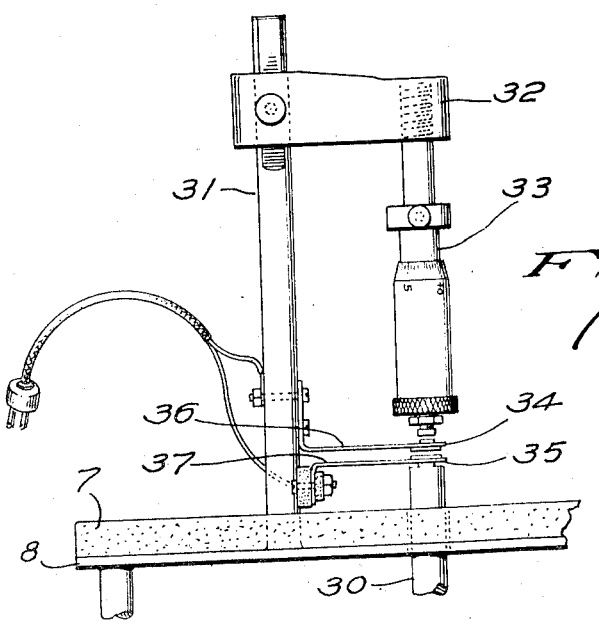
Figure 2 is a fragmentary view of a preferred embodiment of the indicating device showing the contact points with micrometer adjusting means.

Referring to Figure 2, an enlarged view of the preferred indicating mechanism is shown. A standard or rod 31 is supported by plate 8 and lid 7. At the upper end of the standard is an adjustably mounted block 32 having a micrometer 33 attached thereto and dependent therefrom. A pair of contacts 34 and 35 are positioned between and in contact with micrometer 33 and the vertical rod 30 of the linkage mechanism, respectively. These contacts are carried by two bands 36 and 37 of spring metal attached to standard 31 and electrically connected to the source of alternating current and a relay and buzzer as shown in Figure 5.

Referring particularly to Figure 5, the electrical circuits for the motor, transformer and indicating mechanism and automatic cut-off are shown. A suitable source of alternating current is provided for operating motor 3, a small clock-type synchronous motor. The transformer 4, commonly known as a "Variac" is also energized from the source of alternating current. A rod type electrical heater 38 is connected in series with the secondary of the transformer 4. The heater is substantially U-shaped, and positioned in the tank 2 to provide a means of uniformly increasing the temperature of the heat transfer medium at a fixed predetermined rate, as set forth below. Motor 3 and transformer 4 are connected to the source of current through relay 39 which is normally closed, that is, when the device is in operation.

In addition, a device for giving an audible signal, such as the buzzer 40 is also provided and is electrically connected to the source of alternating current through contacts 34 and 35. A toggle switch 41 is provided for opening the buzzer circuit when the contacts 34 and 35 remain closed for any appreciable time. Switch 41 is shown also in Figure 1.

Another toggle switch 42 shown in Figure 1 is provided for independently operating motor 12 which drives the stirrer 15.

Referring particularly to Figure 6, it will be noted that a hollow shaft 46 is centrally located through the transformer 4, and is provided with a dial 44 on its outer end having a pointer 45. A brush-supporting disc 47 is mounted near the inner end of shaft 46. The extreme inner end of the hollow shaft is suitably tapered as at 48 to provide one element of a clutch.

The hub of the sprocket 49 is provided with a tapered recess to receive the clutch element 48 of shaft 46, thus forming a "cone" clutch. The shaft 51, which is located within the tubular shaft 46, has threaded connection with the hub of the sprocket 49 at its inner end and a knurled knob 52 at its opposite end for the purpose of readily locking or releasing the clutch. Thus, with the end of shaft 51 in threaded connection with the hub of sprocket 49, the outer end of shaft 51 carrying the knob 52 forces the tapered end 48 of shaft 46 into the tapered recess of the hub of sprocket 49 to lock the clutch in operating position. The release of the clutch is effected simply by unscrewing shaft 51 from the hub of sprocket 49 by means of the knob 52, and sliding tapered end 48 of shaft 46 out of the hub recess by means of dial 44 connected to the shaft 46.

As clearly shown in Figure 6, the brush supporting disc 47 rotates with sprocket 49 when the "cone" clutch is locked in operating position. The sprocket 49 is driven by motor 3 through a suitable reduction gear mechanism of high ratio and a belt drive (not shown in the drawings). The speed of rotation of sprocket 49 and of the disc 47 may be adjusted to give, for example, an angular velocity equal to one revolution per hour. The slow rotation of the brush supporting disc 47 in turn causes a slow uniform increase in power output in the secondary of the "Variac" transformer 4 by changing the effective voltage ratio between the primary and secondary. As a result a slow uniform increase in temperature of the heater 38 is effected at a fixed predetermined rate.

The scale 43 attached to the housing 1, as shown in Figure 1, is calibrated in degrees of temperature, preferably degrees centigrade, the calibration being accomplished empirically by test operation of the device. Thus, for a given position of the shaft 46 of the variable transformer 4 and the disc 47, a given amount of voltage output from the transformer secondary results in a given power input to the heater 38, which in turn produces a given temperature in the heat transfer medium in tank 2 surrounding the specimen to be tested. Therefore, since dial 44 carrying the pointer 45 rotates with the shaft 46, the scale 43 is calibrated by marking the same for various positions of the pointer 45 during an initial test operation of the device in which the temperature of the heater 38 and the heating medium is noted by means of a thermometer at given intervals. The calibrated scale 43 then affords a means for setting the pointer 45 of the dial 44 and consequently the transformer shaft 46 before locking the "cone" clutch at the correct starting temperature for all succeeding tests whether the heating medium is at room temperature or previously heated as in the case of plastics having high distortion temperatures.

This insures accurate operation of the transformer-heater system to produce the predetermined fixed rate of temperature increase in the heating medium, regardless of the initial starting temperature thereof.

Before originating a test, the temperature of the heating medium in tank 2 is noted with thermometer 50, and the dial 44 is turned so that pointer 45 indicates that temperature on scale 43. The "cone" clutch is then operated or thrown in by means of knob 52 and dial 44 to lock the transformer shaft 46 and disc 47 in the position selected as clearly shown in Fig. 6. Thus, the transformer voltage will be set to give a power input to the heater which results in the fixed predetermined rate of increase in temperature at the reading taken of the temperature of the heating medium in tank 2.

In operation the device functions as follows:

The plastic bar 25 to be tested is mounted on the supporting framework and the assembly is lowered into the tank 2, the lid 7 insulating the top part of the apparatus. The proper weight 11 for the test is placed on the platform 10 of loading rod 9. The micrometer 33 is adjusted so that the contacts 34 and 35 are spaced the exact predetermined amount of deflection in the bar desired to be measured allowing for the known ratio of amplification in the linkage mechanism. The motor 12 is started to operate the stirrer 15 and the temperature of the heating medium, which is present in the tank in excess of the amount to immerse the test specimen completely, is noted on thermometer 50. The dial 44 is then set on scale 43 to the proper starting temperature and the "cone" clutch is thrown in to lock the shaft 46 of the transformer to the motor drive in this position. The driving motor 3 is then started in operation to turn the shaft 46 of the transformer 4 and the disc 47 thus increasing power input to heater 38 and gradually and uniformly increasing the temperature at a predetermined fixed rate, for example, 2° C. per minute. The toggle switch 41 in the buzzer circuit is closed so that the buzzer will sound at the end-point of the test.

The plastic specimen under load gradually distorts as the temperature increases until the heat distortion temperature is reached, or in other words until the deflection of the bar moves the plug 27, lever arm 28 and vertical rod 30 an amount sufficient to close contacts 34 and 35.

When the contacts close the relay 39 is energized, thus opening the circuit of the motor 3 and transformer 4. This automatically cuts off the power input to heater 38 and the temperature within tank 2 will remain constant, varying not more than ½° C. from the true heat distortion temperature in the succeeding several minutes.

Simultaneously with the closing of contacts 34 and 35, the buzzer circuit is energized and an audible signal is continuously sounded until the operator shuts off the buzzer using toggle switch 41. At this time thermometer 50 is read by the operator and the reading indicates the heat distortion temperature of the plastic specimen tested.

The heat distortion tester of the present invention incorporates all requirements of the A. S. T. M., while at the same time it eliminates all previous errors of prior art devices by providing for measurement of deflection from the underside of the test specimen, thus affording more precise and accurate measurement of the heat distortion temperatures of plastics. In addition, the preferred embodiment of the device incorporates full automatic operation including automatic cut-off of the mechanism controlling the heating unit; and an audible warning signal at the end-point of the test. This last mentioned audible signal dispenses with the requirement of the full attention of an operator. Once in operation the device needs no attention until the buzzer gives the audible signal indicating the end-point of the test, at which time the operator reads the thermometer, and opens the buzzer circuit.

A further advantage of the construction and principle of the device is that, although it is preferable to construct the linkage mechanism and supporting framework of Invar metal or other metal having a low coefficient of thermal expansion in order to minimize any effects of temperature differentials within the heating medium, it is not essential or necessary. The framework and linkage mechanism may be constructed of any suitable metal provided the same metal is used throughout. Thus, as a result of the improved construction and principle of the present invention, the device may be more economically produced by employing less expensive materials and its reliability is enhanced.

The heat transfer medium may be any suitable liquid having low vapor pressure, high flash point and high viscosity index. Of course the liquid must not dissolve the plastic and preferably should not swell it. The preferred heating liquid is an oxidation inhibited silicone oil. It possesses the properties enumerated above. The high viscosity index permits efficient stirring over a wide temperature range, and another advantage is its inertness and poor solvent action on most plastics.

What I claim is:

1. A device for measuring heat distortion temperatures of plastic materials comprising a receptacle adapted to contain a plastic specimen to be tested and a heat transfer medium, heating means for slowly and continuously increasing the temperature of said medium, spaced supporting means for bridgingly mounting said plastic specimen within said receptacle, an indicating mechanism for indicating the end point of the test when said specimen is deflected a fixed amount, a deflection transmitting mechanism comprising lever arms forming a linkage, one of said arms being fulcrumed to the supporting means for said specimen and having an element disposed under the specimen and between said spaced supporting means for actuation by the movement of the underside of said specimen under deformation, said deflection transmitting mechanism through movement of said lever arms being operable to actuate said indicating mechanism, and means for indicating the temperature of the heat transfer medium.

2. In a device for measuring the heat distortion temperatures of plastic materials, the combination of a receptacle adapted to contain a plastic specimen to be tested and a heat transfer medium, heating means for slowly and uniformly increasing the temperature of said medium, supporting means for mounting the specimen in said receptacle comprising a framework including a pair of spaced horizontal rods, a removable closure forming the top of said receptacle and having said framework secured thereto, a loading rod inserted through apertures in said closure and framework for weight-loading the specimen under test, an indicating device for indicating the end-point of the test when said specimen is deflected a fixed amount, a deflection transmitting mechanism comprising two lever arms forming a linkage and a coacting element, one of said lever arms being fulcrumed to said framework, said coacting element supported by said framework and freely movable with respect thereto having one end thereof disposed in contact with the underside of the specimen and the other end resting on the free end of said fulcrumed lever, the other of said lever arms forming the linkage adapted to actuate said indicating device upon movement of the underside of said specimen under deformation by a fixed amount, and means for indicating the temperature of said heat transfer medium.

3. A device for measuring the heat distortion temperatures of plastic materials comprising a receptacle adapted to contain a plastic specimen to be tested and a heat transfer medium, heating means for slowly and continuously increasing the temperature of said medium, spaced supporting means for bridgingly mounting said specimen within said receptacle, an indicating mechanism for indicating the end-point of the test when said specimen is deflected a fixed amount, a deflection transmitting mechanism comprising two lever arms forming a linkage and a coacting element, one of said lever arms being fulcrumed to said supporting means, said coacting element supported by said supporting means and freely movable with respect thereto having one end thereof disposed under the specimen and between said spaced supporting means for actuation by the underside of the specimen and the other end resting on the free end of said fulcrumed lever, the other of said lever arms forming the linkage adapted to actuate said indicating device upon movement of the underside of said specimen under deformation by a fixed amount, and means for indicating the temperature of said heat transfer medium.

CHARLES R. STOCK.

REFERENCES CITED

The following references are of record in the file of this patent:

UNITED STATES PATENTS

| Number | Name | Date |
|---|---|---|
| 741,703 | Olsen | Oct. 20, 1903 |
| 1,967,424 | Nevitt | July 24, 1934 |
| 1,200,086 | Cruser | Oct. 3, 1916 |